United States Patent [19]

Packer et al.

[11] 4,075,366

[45] Feb. 21, 1978

[54] LOW GLOSS RADIATION CURE

[75] Inventors: Eugene S. Packer, Chicago; George J. England, Hillside, both of Ill.

[73] Assignee: DeSoto, Inc., Des Plaines, Ill.

[21] Appl. No.: 734,425

[22] Filed: Oct. 21, 1976

Related U.S. Application Data

[63] Continuation-in-part of Ser. No. 694,935, June 11, 1976, abandoned.

[51] Int. Cl.² .............................................. B05D 3/06
[52] U.S. Cl. ................................ 427/44; 204/159.14; 204/159.22; 427/54
[58] Field of Search ............... 427/44, 54; 204/159.16, 204/159.15, 159.23, 159.24, 159.14, 159.22

[56] References Cited

U.S. PATENT DOCUMENTS

| | | | |
|---|---|---|---|
| 3,935,364 | 1/1976 | Proksch et al. | 427/54 X |
| 3,966,572 | 6/1976 | Carder | 427/54 X |

*Primary Examiner*—Michael R. Lusignan
*Attorney, Agent, or Firm*—Dressler, Goldsmith, Clement, Gordon & Shore, Ltd.

[57] ABSTRACT

A low gloss radiation cure is obtained by applying an aqueous emulsion of relatively viscous radiation curable resin and curing the applied film with appropriate radiation energy before the emulsion in the applied film breaks, to produce a cured film containing microscopic discontinuities.

22 Claims, No Drawings

LOW GLOSS RADIATION CURE

The present application is a continuation-in-part of our prior application Ser. No. 694,935 filed June 11, 1976, now abandoned.

The present invention relates to a method for the production of low gloss coatings by the application of radiation energy and especially ultraviolet light to provide the desired cure and using ultraviolet curable coating resins which normally cure to povide coatings of high gloss.

It has been difficult to produce suitable radiation curable coating which will display low gloss or "flat" appearance upon curing. Extremely high application viscosities have resulted from coatings containing sufficient gloss-reducing filler to provide a flat film appearance. Toxicity, skin and eye irritation, noxious odors, and improper air emissions have resulted from using low viscosity reactive diluents or organic solvents in radiation curable coatings in order to obtain the necessary viscosity reduction.

Appropriate gloss-reducing fillers which have been used are illustrated by silica, polyethylene in fine particle form, calcium carbonate, calcium stearate, and the like. In addition to the physical difficulty of handling the viscous pigmented systems, this invention saves the expense of the normally needed filler.

The invention is especially concerned with overprint finishes and similar coatings where very low viscosity is often required to enable the use of gravure equipment. These coatings contain organic solvents and reactive diluents which cause excessive "strike-in" absorption into the fibrous substrate being coated.

In accordance with this invention, the radiation curable resin in the form of a relatively viscous liquid or semi-liquid, is emulsified into water and applied as an emulsion. If the water in the film of applied emulsion is permitted to evaporate or if the emulsion is unstable, the emulsion breaks, leaving a film or layer of viscous resin on the substrate. Exposure of this layer to radiation energy will cure it to provide a glossy coating. A low gloss coating is obtained in accordance with this invention if the radiation energy is applied to the film or layer of applied emulsion before the emulsion breaks.

The mechanism of action by which the emulsion form of the film produces a continuous film containing microscopic bubble-like discontinuities upon rapid radiation cure is not fully clear, and we do not wish to be limited by any theory of operation. However, electron microscopy appears to show that the film is frozen by the rapid radiation cure in an incompletely coalesced condition, thus providing a rough surface in which the gloss reduction is a function of the extent to which coalescence is avoided.

When the method of the invention is carried out, the resulting low gloss coating thus derives from the fact that the cured film, although it is a continuous film, contains microscopic discontinuities. These discontinuities look like tiny bubbles at 3200 magnifications. The effect to the eye is a loss of gloss or flat appearance.

Since the radiation curable resin which is used is relatively viscous or in semi-liquid form and organic solvents and reactive diluents are minimized or avoided, the obnoxious vapors usually encountered and the undesired "strike-in" are effectively overcome, and flatting pigments can be avoided or their use greatly reduced. The cured, low gloss film can also be free of residual solvents or reactive diluents, and this is advantageous.

It should be observed that the particle size of the emulsion can vary considerably. As the particle size decreases, we come closer and closer to the diameter of the molecule as it would exist in a solution. As the particle size gets smaller, larger proportions of flatting pigment are needed, since the flattening effect produced by this invention becomes less significant.

Referring more particularly to the emulsions of relatively viscous radiation curable resin, ultraviolet radiation is primarily contemplated. Any radiation curable resin emulsified by conventional technique may be used, but preferably the emulsions are constituted by viscous droplets containing ethylenically unsaturated tertiary amine stably dispersed by salt formation with an acid in an aqueous continuum.

The ethylenically unsaturated tertiary amine is preferably a polyacrylate in the form of a viscous liquid or semi-solid, desirably having a viscosity of at least 200 centipoises, and it is emulsified in water with the aid of a solubilizing acid to provide an emulsion containing viscous droplets of at least partially neutralized tertiary amine. This emulsion preferably has a resin solids content of at least 40% by weight and a pH of from 4.0-8.5, preferably 6.0 up to 7.0. An ultraviolet photosensitizer is preferably incorporated in the emulsion (preferably into the oil phase thereof) and the emulsion is applied as a film or coating in any desired fashion. This film, when it contains the photosensitizer, is curable upon ultraviolet exposure. Otherwise, penetrating radiation is needed, such as an electron beam.

While any organic compound containing one or more ethylenically unsaturated side chains may be used to provide a cured film upon radiation exposure, polyacrylates are particularly contemplated. This is because acrylate unsaturation responds rapidly to ultraviolet radiation and reacts easily with amino hydrogen atoms. Appropriate polyacrylates are illustrated by pentaerythritol triacrylate, epoxy diacrylates, trimethylol propane triacrylate and the like. Increased acrylate functionality can be provided by consuming hydroxy functionality by reaction with an acrylate monoisocyanate, as, for example, the reaction product of one mol of toluene diisocyanate with hydroxyethyl acrylate. This is particularly attractive when dealing with an epoxy diacrylate having sufficient molecular weight to provide hydroxy functionality which can be converted to acrylate functionality so as to increase the number of acrylate groups in a resinous matrix which provides good properties. Appropriate epoxy resins for this purpose are polyglycidyl ethers of a bisphenol, such as bisphenol A, having a 1,2-epoxy equivalency of from about 1.4 to about 2.0 and a molecular weight of from about 400 to about 6000, preferably from about 600 to about 4000.

While polyacrylates are preferred, as noted above, any ethylenically unsaturated group can be used which will adduct with amino hydrogen, such as the methacrylate or crotonate group. Also, while acrylate esters are preferred, ethers are also useful, such as polynorbornene ethers of polyhydric alcohols, such as glycerin, trimethylol propane, and pentaerythritol. The Michael addition reaction is fastest with acrylates, but it can be carried out with other ethylenically unsaturated moieties using heat and longer reaction periods.

The choice of amines with which to form the unsaturated rated amines is subject to considerable variation, but aliphatic amines are preferred since these have the highest reactivity with the ethylenic groups in the polyethylenic compound. The amine should have from one to two amino hydrogen atoms per molecule, but the preferred amine functionality is one in order to minimize the molecular weight of the tertiary amine Michael adduct. Thus, monosecondary amines are preferred.

The choice of a monosecondary amine is particularly important where the polyethylenic compound is of relatively high molecular weight, as in epoxy polyacrylates, or where hydroxy functional polyacrylates are reacted with diisocyanates to increase molecular weight without reducing the ethylenic functionality.

The preferred monosecondary amines are illustrated by diethyl amine and dibutyl amine, diethyl amine being best in this invention. Dioctyl amine and diallyl amine are also useful. Hydroxy functional amines such as diethanol amine are useful, but are less preferred because the hydroxy groups contribute to instability. Ethyl amine and butyl amine will illustrate higher functional amines such as primary amines which are useful, especially in admixture with the preferred monosecondary amines where a primary amine functions to provide a controlled increase in viscosity by coupling together two molecules of the polyethylenic compound.

From the standpoint of the viscosity of the polyethylenically unsaturated tertiary amines, the preferred amines are resinous, and after solubilization with the solubilizing acid, the preferred resins have a viscosity of at least 500 centipoise, preferably in the range of 6–1000 poise.

The reaction between the amine and the ethylenic unsaturation is a known reaction, (a Michael addition) being easily forced to completion by moderate heat as taught in U.S. Pat. No. 3,844,916.

From the standpoint of association of the solubilizing acids which enable emulsification, the acid protonizes the amine groups to provide an emulsifying agent. The specific nature of the acid is of secondary significance. It is presently preferred to employ phosphoric acid, glycolic acid (hydroxy acetic acid), or acetic acid. Other organic acids can be used, such as formic acid and propionic acid. Inorganic acids such as hydrochloric acid or sulfuric acid can also be used.

The solubilizing acid is used in an amount to provide an oil-in-water emulsion having a preferred pH in the range of pH 6.0–7.0.

While polyethylenically unsaturated tertiary amines emulsified in water with a solubilizing acid are preferred, other types of aqueous emulsions are also useful. Thus, a liquid mixture containing ethylenically unsaturated materials can be emulsified in water with the aid of a surfactant. Again, polyacrylates are preferred and an ultraviolet photosensitizer is desirably incorporated into the oil phase of the emulsion. A suitable liquid mixture of ethylenically unsaturated material is an equi-weight mixture of: 1-the diacrylate formed by adducting 2 moles of hydroxy ethyl acrylate with 1 mole of toluene diisocyanate; 2isobutoxymethylacrylamide; and 3-triethylene glycol diacrylate.

Surfactant selection is not a feature of this invention, but nonionic surfactants are preferred, illustrated by ethylene oxide adducts of monohydric or dihydric hydrophobes, such as octyl or nonyl phenol adducted with from 6–60 moles of ethylene oxide per mol of phenol, e.g. about 9 moles of ethylene oxide would be typical.

Emulsification of a polyethylenically unsaturated amine using a solubilizing acid has previously been noted, but the chemistry can be reversed. Reacting pentaerythritol di- or tri-acrylate with a polybasic acid, such as itaconic acid or maleic anhydride, will produce a carboxyl functional ester which can be emulsified in water with the aid of a base. Similarly, the polyacrylate could be reacted with beta mercaptopropionic acid or thioglycolic acid, to again provide the carboxyl substituent for emulsification with the aid of a base.

Any volatile base would be appropriate, such as ammonia or an amine, preferably a tertiary amine such as triethyl amine or monomethyl diethanol amine.

The class of ultraviolet photosensitizers useful in this invention is also well known, and it is illustrated in said U.S. Pat. No. 3,844,916. The useful ultraviolet photosensitizer is illustrated herein using benzophenone, but benzoin ethers, especially the $C_1$–$C_4$ alkyl ethers are also preferred.

Organic solvent is not normally needed in this invention, but it is possible to use a small proportion of solvent, e.g., up to about 15% by weight, for various purposes. The most important reason for using organic solvent is to permit the use of polyacrylates of such high molecular weight that they are insufficiently liquid for emulsification without organic solvent. The selection of solvent will vary with the intended purpose, but xylene or octyl alcohol will illustrate water immiscible solvents which can aid emulsification by reducing the viscosity of the polyacrylate.

Further details of the emulsions which are preferably used in this invention are set forth in the commonly owned copending application of Leslie Gatechair, Ser. No. 629,558, filed Nov. 6, 1975, the disclosure of which is incorporated herein by reference. Other resin emulsions are illustrated in the examples.

It is desired to point out that the water content of the emulsion under consideration is significant. The more water, the more flatting. However, the more water, the more difficult it is to get rid of this water without coalescence or excessive radiation exposure. On this basis the water content of the emulsion is desirably kept within the range of about 5–40%, and preferably with the range of about 10–35%. Best results are obtained at a water content of about 20–30%.

The presence of an emulsion is easily detected by the fact that the water containing mixture is milky in appearance rather than relatively clear as would be the case where the water dissolves in the ethylenically unsaturated material or where the unsaturated material essentially dissolves in the water.

The invention is illustrated in the examples which follow.

EXAMPLE 1

93g pentaerythritol tetraacrylate (about 3.2 acrylate groups per molecule—600–800 poise)
8g diethylamine Warm to 60° until exotherm of Michael Addition Reaction is complete and then add:

5g glacial acetic acid
5g benzophenone.

To the above vehicle, at time of use, add 110g of deionized water and blend until a homogeneous milky fluid results. Apply to Kraft paper with a #3 wire wound rod or suitable quadragravure roller. Cure immediately after application (within 15 seconds for best results) by placing on a conveyor belt which passes under three standard 200 watt per inch mercury lamps. Belt speed is variable; preferred speed is 100 feet per minute.

Gloss <10 at 60° on Hunter Glossmeter

EXAMPLE 2

85g pentaerythritol tetraacrylate (about 3.2 acrylate groups per molecule — 600–800 poise)
10g dihydrogenated cocoa amine
Warm to 70° C. until Michael Addition Reaction is complete.
Add 5g diethylamine
Warm to 60° C. until exotherm of Michael Addition Reaction is complete and then add:
  5g glacial acetic acid
  5g benzophenone.

To the above vehicle, at time of desired use, add 110g of deionized water and blend until a homogeneous milky fluid results. Apply to printed vinyl sheet with #12 wire wound rod or suitable quadragravure roller. Cure immediately after application (within 15 seconds preferred) on a conveyor belt moving under focused 200 watt per inch mercury lamps. Belt speed is variable; preferred speed is 100 feet per minute. Gloss <10 on Hunter Glossmeter at 60°.

Comparable results can be obtained by repeating Example 1 using a corresponding proportion (same number of equivalents) of glycolic acid and phosphoric acid. Glycolic acid is preferred. Similarly, the pentaerythritol tetraacrylate can be successfully replaced with trimethylol propane triacrylate, acrylated epoxy resin (Shell DRH-300), or acrylated epoxidized oil (Union Carbide Actomer X-80), (same proportion of acrylic unsaturation) and the benzophenone can be replaced with an equal weight of 2,2'-diethoxyacetophenone.

A series of comparative runs were made using the emulsion formed in Example 1 in which glycolic acid replaced the acetic acid. The resulting emulsion was applied on a paper substrate and subjected to ultraviolet curing as detailed in Example 1, but the time of cure was varied. When the cure took place 2 seconds after application, the resulting film was filled with what appears to be microscopic bubbles at 3200 magnifications. When the system was cured after 15 seconds, some of the bubbles are still present. After 30 seconds, very few bubbles are present, and after 45 seconds, hardly any buubbles could be discerned. The gloss obtained after 2 seconds was quite low and there was still some discernible flatting in the system cured after 15 seconds, but after 30 or 45 seconds, the gloss was high and no useful flatting was obtained. For this particular emulsion, the 15 second dwell time prior to ultraviolet cure represents an approximate upper limit from the standpoint of obtaining any significant flatting.

The addition of 5–20% of silica to the composition of Example 1 can be tolerated, and it provides a further reduction in the gloss of the cured film. However, maximum lowering of gloss requires rapid cure following application.

EXAMPLE 3

This example illustrates the principle of the invention without the formulation containing any amine or solubilizing acid:

Step 1

83.8 parts Polyoxybutylene-based polyurethane prepolymer with about 2.0 terminal isocyanate groups per molecule (The product Adiprene L-167 of DuPont may be used if desired)
16.1 parts 2-hydroxyethyl acrylate
0.1 part Dibutyl tin dilaurate Mix the above while heating at 70° C. in a nitrogen atmosphere until all the isocyanate present in the polyisocyanate has been reacted. This can be determined by following the infrared spectrum of the product. The product has a viscosity of about 20,000 centipoise.

Step 2

5 parts Ethylene oxide adduct of nonyl phenol (nonionic emulsifying agent—the product Triton X-405 may be used if desired)
100 parts Water
10 parts Benzophenone (liquid)

Place the reaction product from Step 1 in a Waring blender. Add the nonionic emulsifying agent while blending. Add the water slowly while blending at high speed until a white stable emulsion results. Blend in the benzopheneone sensitizer.

Apply the product from Step 2 to enameled paper with a #12 wire wound rod. Cure the film immediately (within 5 seconds) after application on a conveyor belt moving at 50 feet/minute under three 200 watt/inch mercury lamps focused near the plane of the belt. Curing is done in air. The resultant cured film displays a 60° gloss reading of 3. Repeat the application and curing process only let there be a 30 second time delay between application of the film and the time of cure. This time the cured film has a 60° gloss reading of about 90.

EXAMPLE 4

Emulsions of various water content was prepared by blending the following mixture with deionized water on a laboratory mixer until a homogeneous milky white emulsion is present:
  33.3% Polyoxyybutylene-based polyurethane diisocyanate adducted with two equivalents of hydroxyethyl acrylate (Adiprene L-200 may be used)
  33.3% Acrylic acid
  33.3% Diethylaminoethyl acrylate
  5% by weight of benzophenone is added to a mixture of the above and warmed to 65° C. for 1 to 2 hours. Various amounts of water are added with vigorous agitation to produce an emulsion. The resulting emulsions were applied to contrast ratio cards with a #18 wire wound rod and fully cured in air, the cure requiring two passes at 100 feet per minute under three focused 200 watt per inch mercury lamps.

The emulsions containing from about 20 to 30% water possessed a viscosity in the range of about 100 to 400 cps., and these are considered to be the most useful. The emulsion containing 25% water will be used as illustrative. It had a pH of 4–5 and is stable overnight at room temperature.

The 25% water content emulsion applied and cured as noted above cured to provide greatly different gloss readings on a 60° glossmeter. When the cure follows deposition rapidly, e.g., from 5 to 30 seconds, the gloss varied from 9 to 16. If one waits 5 minutes before curing, then the gloss is quite high (82). It will be noted that the high solids content of the emulsion does not prevent the achievement of useful flatting over a reasonable period of time.

The variation in water content also contributes interesting information. At 0% water, and curing the film within 5 seconds of application, the 60° gloss is 99. However, as soon as we have an emulsion, even with as little as 5% water present, the gloss of the cured film drops to 36. Moreover, the more water present in the emulsion, the coalescence is hampered during the cure, and the lower the gloss which is obtained. At 10% water, the gloss was reduced to 20, and at 20% water, the gloss was reduced to 14. As is evident, the effecto of lowering gloss increased as the water content is increased, but this must be balanced against the fact that large amounts of water make it progressively more difficult to obtain a rapid and useful radiation cure. It is particularly difficult, when the proportion of water is excessive, to obtain sufficient coalescence to provide adequate film integrity when one exposes the applied film before the emulsion breaks.

It is also of interest to note that the form of the emulsion is secondary. Thus, there seems to be a gradual change from a water-in-oil emulsion to an oil-in-water emulsion as the proportion of water increases. Curiously, there is no clear inversion point.

In preferred practice the emulsion is an oil-in-water.

The invention is defined in the claims which follow.

We claim:

1. A method of obtaining a low gloss radiation-cured coating comprising applying an aqueous emulsion coating composition to a substrate, said emulsion being constituted by water having emulsified therein viscous droplets comprising radiation curable resin, and subjecting said applied emulsion to radiation energy to cure the same before the emulsion breaks.

2. A method as recited in claim 1 in which said resin is ethylenically unsaturated tertiary amine reacted with a solubilizing acid, and said radiation energy is ultraviolet light.

3. A method as recited in claim 1 in which said emulsion as a resin solids content of at least 40% by weight.

4. A method as recited in claim 2 in which said ethylenically unsaturated tertiary amine reacted with a solubilizing acid in the absence of water has a viscosity of at least 200 centipoise.

5. A method as recited in claim 1 in which said ethylenically unsaturated tertiary amine reacted with a solubilizing acid in the absence of water has a viscosity of from 6–1000 poise.

6. A method as recited in claim 1 in which an ultraviolet photosensitizer is incorporated in said emulsion to render the same curable with ultraviolet light and ultraviolet light exposure is used to cure the coating.

7. A method as recited in claim 1 in which an ultraviolet photosensitizer is incorporated in said viscous droplets.

8. A method as recited in claim 1 in which said ethylenically unsaturated tertiary amine is a polyacrylate.

9. A method as recited in claim 1 in which said emulsion has a pH in the range of pH 4.0–8.5.

10. A method as recited in claim 1 in which said ethylenically unsaturated tertiary amine is a polyethylenically unsaturated organic compound Michael adducted with 0.2–1.2 equivalents of amine per mol of said organic compound.

11. A method as recited in claim 10 in which the ethylenically unsaturated organic compound is reacted with a monosecondary amine.

12. A method as recited in claim 11 in which the monosecondary amine is selected from diethyl amine and dibutyl amine.

13. A method as recited in claim 12 in which said ethylenically unsaturated tertiary amine has a viscosity in excess of 500 centipoise.

14. A method as recited in claim 1 in which the solubilizing acid is selected from acetic and glycolic acids.

15. A method as recited in claim 1 in which flatting pigment is added to further reduce the gloss.

16. A method of obtaining a low gloss radiation-cured coating comprising applying an aqueous emulsion coating composition to a substrate, said emulsion having a resin solids content of at least 40% by weight and comprising water and radiation curable resin, and subjecting said applied emulsion to radiation energy to cure the samme before the emulsion breaks whereby complete coalescence of said emulsion is prevented to lower the gloss which is obtained.

17. A method as recited in claim 16 in which an ultraviolet photosensitizer is present in said emulsion, and ultraviolet light exposure is used to cure the coating.

18. A method as recited in claim 17 in which said emulsion contains from about 5 to about 40% of water.

19. A method as recited in claim 17 in which said emulsion is an oil-in-water emulsion containing from about 20 to about 30% of water.

20. A method as recited in claim 19 in which said radiation curable resin comprises a polyacrylate having a viscosity of at least 500 centipoise.

21. A method as recited in claim 20 in which said polyacrylate is emulsified in the water by means of an ethylenically unsaturated tertiary amine.

22. A method as recited in claim 18 in which said radiation curable resin comprises a polyacrylate having a viscosity of at least 500 centipoise, and said emulsion is stabilized by the presence of a nonionic surfactant.

* * * * *